UNITED STATES PATENT OFFICE.

ASAHEL K. EATON, OF BROOKLYN, N. Y., ASSIGNOR TO "THE EATON FIBER COMPANY," OF NEW YORK CITY.

IMPROVEMENT IN THE MANUFACTURE OF PAPER-PULP.

Specification forming part of Letters Patent No. 119,224, dated September 26, 1871.

*To all whom it may concern:*

Be it known that I, ASAHEL K. EATON, of Brooklyn, in the county of Kings and State of New York, have invented a certain new and useful Improvement in the Manufacture of Paper-Pulp; and I do hereby declare the following to be such a full, clear, and exact description of the same as will enable those skilled in the art to which my invention appertains to use or practice the same.

In the treatment of wood, straw, or other similar substances for the production of paper-pulp a solvent is required that will remove the silicious, resinous, and other incrusting material that are associated with the cellulose or ultimate vegetable fiber sought for. The object of my invention is to cheapen the production of straw or wood-paper by furnishing a cheaper and more active solvent to take the place of those now used in the manufacture of this kind of paper.

My invention consists in the use of a solution of the sulphide of sodium as a solvent for the purpose of separating the incrusting material from the ultimate fiber, as above specified, in place of the solvents now used in the manufacture of paper-pulp. This solvent acts very rapidly and efficiently, and may be used either in open vessels at low temperatures or in close vessels under pressure and high heat.

The sulphide of sodium is produced by heating a mixture of about seventy-one parts of the anhydrous sulphate of soda with twenty-four parts of pulverized charcoal, coke, or other form of carbon to redness in a crucible, retort, or other suitable receptacle, and maintaining the heat so long as any carbonic oxide is evolved; after which the ignited mass is removed and thrown into water. The resulting solution of sulphide of sodium is made of the strength of about 3° Baumé, and is applied to the wood, straw, or other vegetable substances in precisely the same manner as caustic soda and other solvents as are now used. Sawdust or any other finely-divided vegetable substance may be used instead of charcoal or coke in the preparation of the sulphide of sodium, proportioning the material used to the percentage of carbon contained therein.

The crude sulphate of soda is used in the manufacture of the solution on account of its cheapness, it being a refuse material, produced in large quantities in the manufacture of nitric and muriatic acid.

The strength of the solution may be increased to nine (9°) Baumé or more, if rapidity of action is required.

Having now described the nature and extent of my invention, I claim as new herein and desire to secure by Letters Patent—

The use of the sulphide of sodium as a solvent in the treatment of wood, straw, or other vegetable fiber for the purpose of producing paper-pulp.

A. K. EATON.

Witnesses:
AMOS BRODNAX,
H. S. FIRMAN.

(81)